Patented Oct. 28, 1952

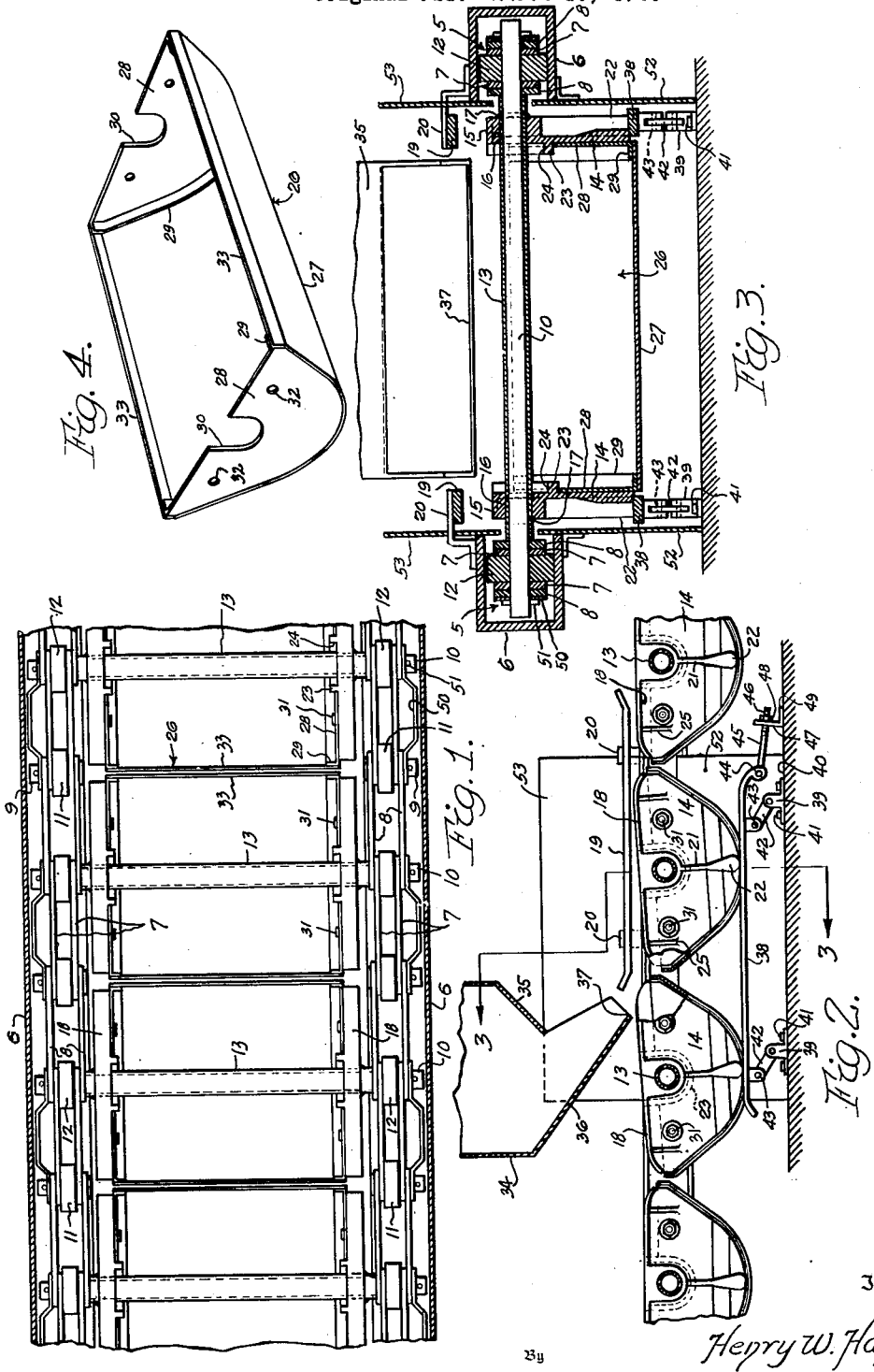

2,615,557

UNITED STATES PATENT OFFICE 2,615,557

BUCKET CONVEYER STRUCTURE

Henry W. Hapman, Detroit, Mich., assignor, by mesne assignments, of sixty per cent to Henry W. Hapman and forty per cent to Hannah J. Hapman, both of Detroit, Mich.

Original application March 18, 1944, Serial No. 527,036. Divided and this application July 30, 1948, Serial No. 41,512

8 Claims. (Cl. 198—56)

The present invention relates to improvements in driers and, more particularly, to a conveyor structure therefor.

One object of the invention is to provide a drier and conveyor structure therefor, having a novel filling means arranged relative to the conveyor buckets so as to eliminate the waste and loss of material while the buckets are being filled as they pass beneath the loading hopper.

Another object of the invention is to provide a conveyor structure of the above-mentioned type having weighted tripping members on the end plates of the conveyor buckets so as to maintain the buckets in a horizontal position for the major portion of their sinuous travel through the drier housing and provide means for engaging said weighted tripping members adjacent the loading station so as to tilt the buckets slightly as they travel beneath the filling hopper whereby the rear edge of each bucket will be elevated above the front edge of an adjacent bucket as the buckets travel beneath the filling hopper which causes the material to flow to the various buckets and provides a cutoff between the buckets so as to eliminate the spilling of the material being conveyed and dried between said buckets.

This is a division of my co-pending application Serial No. 527,036, filed March 18, 1944, for Combined Drier and Conveyor Structure Therefor, which has matured into U. S. Patent No. 2,476,039 of July 12, 1949.

In the drawings:

Figure 1 is a top plan view of a portion of a bucket conveyor structure arranged to prevent loss of material by material falling between the buckets;

Figure 2 is a longitudinal section through the conveyor structure shown in Figure 1 showing the mechanism for slightly tilting each leading bucket as it passes beneath the loading station so as to cause its rearward edge to be raised above the forward edge of the trailing or succeeding bucket;

Figure 3 is a vertical cross-section taken along the line 3—3 in Figure 2; and

Figure 4 is a perspective view of a conveyor bucket pan used in the bucket conveyor of Figures 1 to 3 inclusive.

Referring to the drawings in detail, Figures 1 to 3 inclusive show a bucket conveyor structure, according to a preferred form of the invention, as including a pair of conveyor chains, generally designated 5, supported by spaced opposed channel guide members 6 (Figure 3) opening toward one another. Each conveyor chain 5 includes inner and outer links 7 and 8 respectively, the alternate pairs thereof being interconnected by pivot pins 9 (Figure 1). The other ends of the inner and outer links 7 and 8 are interconnected by the conveyor bucket supporting shafts 10 and rollers 11 and 12 are disposed on the chain pivot pins 9 and conveyor supporting shafts 10 respectively, with the rollers supported between the ends of said pairs of links. The rollers 11 and 12 are adapted to travel in the opposed channelways 6.

Pivotally mounted on and suspended from each shaft 10 is a conveyor bucket generally designated 13 the ends of which are supported by a pair of end plates 14. The end plates 14 are provided with enlarged bearing bosses 15 having openings 16 for receiving a tubular shaft 17 (Figure 3) which is rotatably mounted on the conveyor bucket supporting shaft 10, the bearing bosses being welded to the ends of the tubular shaft 17. The extreme ends of each tubular shaft 17 project laterally and engage the innermost outer link 8 of the conveyor chain so as to hold said chains in spaced apart relation. The end plates 14 are provided along their top edges with flanges 18 for engaging a slide trackway 19 (Figure 2) supported by the opposed channel guide 6 by means of suitable brackets 20, so as to hold the buckets 13 against limited swinging movement of the supporting shaft 10 as illustrated in Figure 2 as the buckets traverse the loading station or filling hopper. The end plates 14 of the conveyor buckets 13 are provided with vertical ribs 21 having enlarged weighted portions 22 at the lower ends thereof to project laterally from the end walls of the conveyor buckets and provide tilting means for the buckets as they traverse the loading station and, if desired, tripping means for the buckets at a dumping station. The end plates 14 on their inner sides are provided with enlarged bosses 23 (Figure 3) having recesses 24 for optionally receiving tripping arms (not shown). Reenforcing webs 25 interconnect the end plates 14 of the conveyor bucket with the guide ribs 18 to increase the rigidity of the end wall structure and provide a substantially solid casting. The bucket pan 26 of the conveyor bucket 13 is illustrated in Figure 4 and indicated generally by the reference character 26, and said bucket pan 26 includes an arcuately curved bottom wall 27 having end walls 28 secured thereto to complete the structure. The end walls 28 are provided with inwardly directed marginal flanges 29 to which the bottom wall 27 may have its ends secured as by means of welding or the like. Each of the end walls 28 of the conveyor bucket pan 26 is cut away as at 30 to receive the enlarged boss 23 on the inner surface of the conveyor bucket and plate members 14. Machine screws or the like 31 are passed through openings 32 in the end walls 28 of the bucket structure so as to securely anchor said bucket structure 26 to the end plate 14 as illustrated clearly in Figure 2. The bottom wall 27 has its free edges slightly angled to provide upstanding flange portions which reenforce the lips 33 of the bucket pan 26 so as to prevent bending thereof.

As shown in Figure 2, a loading hopper, generally designated 34, is disposed above the conveyor buckets for the purpose of filling the same and is provided with a short slanting bottom wall portion 35 and a staggered elongated bottom wall portion 36 thereby forming a discharge spout 37, inclined downwardly and rearwardly in a direction opposite to the direction of conveyor travel to permit the material being loaded to be discharged into the conveyor buckets. In order to prevent the material being discharged from overflowing the buckets 13, they are tilted slightly and within the limits of the guide track 19 by means of an adjustable tilting guide trackway 38 (Figure 2) engageable with the weighted projections 22. A tilting guide trackway 38 is located at each end of the conveyor bucket 13 and is pivotally supported by a pair of bracket members 39 arranged in spaced relation and fastened to the floor 40 by means of bolts or the like as at 41. Pivot links 42 interconnect the brackets 39 and the tilting trackway 38 and said interconnecting links are pivoted thereto as at 43. One end of each of the tilting tracks or guideways 38 is provided with an eye 44 for pivotally receiving a screw rod 45 so that the free ends of the screw rod as at 46 may extend through a bracket 47 and be adjustably held in place by a locking nut 48. The bracket 47 is fastened to the floor 40 by its angle portion 49. It will thus be seen that the tilting trackway 38 may be raised or lowered in parallelism with the floor 40 so that the rearward lips 33 of the conveyor buckets entering the filling station will be tilted slightly as in Figure 22 so that one end of the guide flange 18 will be moved into sliding engagement with the slide trackway 19 at each end of the conveyor bucket.

The conveyor chains comprising the links 7 and 8 are also provided with guide shoes 50 (Figure 1) affixed to the chain pins 9 and to the ends of the conveyor supporting rods 10. Said shoes, links and rollers are held in place by cotter keys 51 extending through suitable apertures in the ends of the link pins 9 and conveyor supporting rods 10 respectively.

As illustrated in Figure 3, a pair of material confining plates 52 and 53 are disposed at each side of the loading hopper above and below the opposed channel members 6 so as to prevent the material being fed to the buckets from escaping laterally and to hold down as much as possible dust arising from the falling of the powdered material. The lower confining plate 52 terminates a short distance short of the ends of the tubular shaft 17 and similarly the upper confining plates 53 have their lower edges terminating a distance in close relation to said tubular shafts 17 so as to shield the opposed conveyor chains against contamination and clogging by the material being fed to the buckets.

In the operation of the invention, the conveyor chains 5 are driven in the usual way by conventional sprockets (not shown) so that the buckets 13 are caused to move from right to left in Figures 1 and 2, or in the direction indicated by the arrows of the section line 3—3 in Figure 2. As each bucket 13 arrives at the tilting guide trackways 38, it is tilted forwardly by the engagement of the ends 22 of the bucket end plate ribs 21 with the trackways 38, so that its rearward or trailing lip 33 is raised above its normal traveling level while the forward or leading lip 33 of the next succeeding bucket 13 is depressed below its normal traveling level. When the guide trackways 38 have been adjusted to their proper heights (Figure 2), the line of direction of discharge of material from the spout 37 will fall below a plane drawn through the momentarily raised rearward or trailing lip 33 of the forward bucket 13 and the momentarily depressed forward or leading lip 33 of the next succeeding or rearward bucket 13, with the result that material being discharged from the downwardly and rearwardly inclined spout 37 will fall either into the forward or rearward bucket 13 without falling through the space between said buckets 13.

What I claim is:

1. A conveyor structure comprising a pair of spaced conveyor chain guide members, a pair of conveyor chains arranged in supporting engagement with said guide members, conveyor buckets supported by said conveyor chains, a material loader arranged adjacent the path of travel of said buckets and having a material discharge portion inclined downwardly and rearwardly in a direction opposite to the direction of conveyor travel, and bucket-tilting mechanism disposed adjacent said material loader and engageable with each bucket in response to its arrival beneath said loader and adapted to tilt said arriving bucket and elevate the lip of the trailing edge thereof while depressing the lip of the leading edge of the next succeeding bucket, each pair of buckets arriving beneath said material discharge portion being momentarily tilted forwardly into a position where the plane including the lips of the said pair of buckets is inclined from the horizontal at a greater angle than the path of the material as it enters the buckets whereby said elevated edge shields the gap between adjacent buckets against loss of material falling through said gap during delivery from said material holder discharge portion into said buckets.

2. A conveyor structure comprising a pair of spaced conveyor chain guide members, a pair of conveyor chains arranged in supporting engagement with said guide members, conveyor buckets supported by said conveyor chains, a material loader arranged adjacent the path of travel of said buckets and having a material discharge portion inclined downwardly and rearwardly in a direction opposite to the direction of conveyor travel, a bucket-tilting member connected to each bucket and projecting therefrom, a bucket operating element disposed adjacent said material loader discharge portion and tiltingly engageable with said bucket-tilting members, each pair of buckets arriving beneath said material discharge portion being momentarily tilted forwardly into a position where the plane including the lips of the said pair of buckets is inclined from the horizontal at a greater angle than the path of the material as it enters the buckets.

3. A conveyor structure comprising a pair of spaced conveyor chain guide members, a pair of conveyor chains arranged in supporting engagement with said guide members, conveyor buckets supported by said conveyor chains, a material loader arranged adjacent the path of travel of said buckets and having a material discharge portion inclined downwardly and rearwardly in a direction opposite to the direction of conveyor travel, a bucket-tilting member connected to each bucket and projecting therefrom, and an abutment mounted in proximity to said material loader and tiltingly engageable with said bucket-tilting members, each pair of buckets arriving beneath said material discharge portion being momentarily tilted forwardly into a position where the plane including the lips of the said pair of buckets is inclined from the horizontal at a greater angle than the path of the material as it enters the buckets.

4. A conveyor structure comprising a pair of spaced conveyor chain guide members, a pair of conveyor chains arranged in supporting engagement with said guide members, conveyor buckets pivotally mounted on and between said conveyor chains, a material loader arranged adjacent the path of travel of said buckets and having a material discharge portion inclined downwardly and rearwardly in a direction opposite to the direction of conveyor travel, a bucket-tilting member mounted at the end of each bucket and projecting outwardly from the pivotal axis thereof, and an abutment tiltingly engageable with said bucket-tilting members, each pair of buckets arriving beneath said material discharge portion being momentarily tilted forwardly into a position where the plane including the lips of the said pair of buckets is inclined from the horizontal at a greater angle than the path of the material as it enters the buckets.

5. A conveyor structure comprising a pair of spaced conveyor chain guide members, a pair of conveyor chains arranged in supporting engagement with said guide members, conveyor buckets pivotally mounted on and between said conveyor chains, a material loader arranged adjacent the path of travel of said buckets and having a material discharge portion inclined downwardly and rearwardly in a direction opposite to the direction of conveyor travel, a bucket-tilting member mounted at the end of each bucket and projecting outwardly from the pivotal axis thereof, and an abutment tiltingly engageable with said bucket-tilting members mounted adjacent the bucket to be tilted and beneath said material loader, each pair of buckets arriving beneath said material discharge portion being momentarily tilted forwardly into a position where the plane including the lips of the said pair of buckets is inclined from the horizontal at a greater angle than the path of the material as it enters the buckets.

6. A conveyor structure comprising a pair of spaced conveyor chain guide members, a pair of conveyor chains arranged in supporting engagement with said guide members, conveyor buckets supported by said conveyor chains, a material loader arranged adjacent the path of travel of said buckets and having a material discharge portion inclined downwardly and rearwardly in a direction opposite to the direction of conveyor travel, a bucket-tilting member connected to each bucket and projecting therefrom, and a cam mounted in the path of travel of said bucket-tilting members and tiltingly engageable therewith, each pair of buckets arriving beneath said material discharge portion being momentarily tilted forwardly into a position where the plane including the lips of the said pair of buckets is inclined from the horizontal at a greater angle than the path of the material as it enters the buckets.

7. A conveyor structure comprising a pair of spaced conveyor chain guide members, a pair of conveyor chains arranged in supporting engagement with said guide members, conveyor buckets supported by said conveyor chains, a material loader arranged adjacent the path of travel of said buckets and having a material discharge portion inclined downwardly and rearwardly in a direction opposite to the direction of conveyor travel, a bucket-tilting member connected to each bucket and projecting therefrom, an abutment tiltingly engageable with said bucket-tilting members and movably mounted relatively thereto, and an adjusting device connected to said abutment and engageable therewith to adjustably vary the position of said abutment relatively to said bucket-tilting members, each pair of buckets arriving beneath said material discharge portion being momentarily tilted forwardly into a position where the plane including the lips of the said pair of buckets is inclined from the horizontal at a greater angle than the path of the material as it enters the buckets.

8. A conveyor structure comprising a pair of spaced conveyor chain guide members, a pair of conveyor chains arranged in supporting engagement with said guide members, conveyor buckets supported by said conveyor chains, a material loader arranged adjacent the path of travel of said buckets and having a material discharge portion inclined downwardly and rearwardly in a direction opposite to the direction of conveyor travel, a bucket-tilting member connected to each bucket and projecting therefrom, an abutment tiltingly engageable with said bucket-tilting members, and mechanism for adjustably moving said bucket-tilting member and said abutment relatively to one another, each pair of buckets arriving beneath said material discharge position being momentarily tilted forwardly into a position where the plane including the lips of the said pair of buckets is inclined from the horizontal at a greater angle than the path of the material as it enters the buckets.

HENRY W. HAPMAN.

REFERENCES CITED

The following references are of record in the file of this patent:

UNITED STATES PATENTS

| Number | Name | Date |
| --- | --- | --- |
| 496,852 | Butler | May 9, 1893 |
| 503,870 | McCaslin | Aug. 22, 1893 |
| 552,664 | Hunt | Jan. 7, 1896 |
| 1,090,156 | Kendall | Mar. 17, 1914 |
| 2,189,243 | Evans | Feb. 6, 1940 |